United States Patent
Graham et al.

(10) Patent No.: US 11,172,021 B2
(45) Date of Patent: Nov. 9, 2021

(54) FILE OBJECTS DOWNLOAD AND FILE OBJECTS DATA EXCHANGE

(71) Applicants: Hewlett-Packard Development Company, L.P., Spring, TX (US); Christoph Graham, Spring, TX (US); Jie Xu, Shanghai (CN); Xiaofei Zhu, Shanghai (CN)

(72) Inventors: Christoph Graham, Spring, TX (US); Jie Xu, Shanghai (CN); Xiaofei Zhu, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/959,163

(22) PCT Filed: Feb. 6, 2018

(86) PCT No.: PCT/CN2018/075386
§ 371 (c)(1),
(2) Date: Jun. 30, 2020

(87) PCT Pub. No.: WO2019/153113
PCT Pub. Date: Aug. 15, 2019

(65) Prior Publication Data
US 2020/0366734 A1 Nov. 19, 2020

(51) Int. Cl.
*H04L 29/08* (2006.01)
*G06F 16/182* (2019.01)

(52) U.S. Cl.
CPC ...... *H04L 67/1085* (2013.01); *G06F 16/1834* (2019.01); *H04L 67/06* (2013.01); *H04L 67/1059* (2013.01); *H04L 67/1089* (2013.01); *H04L 67/1091* (2013.01)

(58) Field of Classification Search
CPC ............ H04L 67/1085; H04L 67/1091; H04L 67/1059; H04L 67/1089; H04L 67/06
See application file for complete search history.

(56) References Cited

U.S. PATENT DOCUMENTS

| | | | |
|---|---|---|---|
| 6,718,361 B1 | 4/2004 | Basani et al. | |
| 7,761,503 B2 | 7/2010 | Dhawan et al. | |
| 8,346,843 B2 | 1/2013 | Jain | |
| 8,812,799 B2 | 8/2014 | Bish et al. | |
| 2003/0009603 A1 | 1/2003 | Ruths et al. | |
| 2005/0177853 A1 | 8/2005 | Williams et al. | |
| 2007/0276836 A1 | 11/2007 | Chatterjee et al. | |
| 2008/0089248 A1* | 4/2008 | Ushiyama | H04L 12/1854 370/256 |
| 2009/0234947 A1 | 9/2009 | Decasper et al. | |
| 2011/0238828 A1 | 9/2011 | Grigsby et al. | |
| 2012/0096116 A1 | 4/2012 | Mislove et al. | |
| 2014/0040421 A1* | 2/2014 | Baldwin | H04L 65/60 709/217 |

(Continued)

*Primary Examiner* — Arvin Eskandarnia
*Assistant Examiner* — Chhian (Amy) Ling
(74) *Attorney, Agent, or Firm* — Conley Rose PC (57) ABSTRACT

A set of computers can be grouped into a first group and second group of computers to receive a file object. The first group of computers are commanded to perform a peer-to-peer download of the file object from a source. The second group of computers are commanded to perform a peer-to-peer download of the file object from a computer in the first group of computers.

14 Claims, 5 Drawing Sheets

(56) References Cited

U.S. PATENT DOCUMENTS

| | | | |
|---|---|---|---|
| 2014/0101326 A1* | 4/2014 | Stoica | H04L 67/1023 709/228 |
| 2015/0229712 A1* | 8/2015 | Zhang | H04L 65/4069 709/204 |
| 2017/0374142 A1* | 12/2017 | Soufiane | H04L 67/104 |

* cited by examiner

FILE OBJECTS DOWNLOAD AND FILE OBJECTS DATA EXCHANGE

BACKGROUND

File objects may need to be distributed to computers across a network. A managed distribution of the file objects may be used to allow for an efficient use of resources in distributing the file objects. A tiered distribution scheme may be used, where a first tier group of computers download the file objects from a host, then host the download of the file objects by a second tier group of computers.

BRIEF DESCRIPTION OF THE DRAWINGS

Various examples will be described below referring to the following figures.

DETAILED DESCRIPTION

File objects include objects that may be associated with a file directory system of a computer, such as a file or directory. A directory may include multiple file objects, such as files and directories. Distributing file objects across a network of computers can be costly, both in terms of time and consumed bandwidth. Corporations trying to distribute file objects, which may include information such as a patch or sales data, across their corporate networks seek to minimize the cost of distribution. Various solutions exist, but can suffer from issues such as single-point of failure or bandwidth congestion or bottleneck issues.

A modified peer-to-peer system may be implemented that performs a managed distribution of the file objects. Using administration computers, a distribution hierarchy can be created that allows for a tiered distribution of the file object. A first tier of computers may download the file object from a host, and in turn host the file object for a second tier of computers. This may allow for efficient deployment of the file object, whether it is efficiency of time, bandwidth, cost, or some other measure being considered by the administration computers. By dynamically selecting the tiers and groupings of computers for each file object and allowing for a peer-to-peer download, single point-of-failure issues may be reduced or eliminated.

In one example in accordance with the present disclosure, a system is provided. The system comprises a processor; a computer-readable medium coupled to the processor; a network interface connector coupled to the processor and the computer-readable medium; and a program stored on the computer-readable medium, wherein execution of the program is to cause the processor to: identify a file object available for download from a source; identify a set of computers to receive the file object; select a first group of computers from the set of computers; select a second group of computers from the set of computers; send a first command via the network interface connector to the first group of computers, the first command comprising information to download the file object from the source and information to exchange file object data amongst the first group of computers; and send a second command via the network interface connector to the second group of computers, the second command comprising information to download the file object from a computer in the first group of computers and information to exchange file object data amongst the second group of computers.

In one example in accordance with the present disclosure, a system is provided. The system comprises a processor; a computer-readable medium coupled to the processor; a network interface connector coupled to the processor and the computer-readable medium; and a program stored on the computer-readable medium, wherein execution of the program is to cause the processor to: select a first computer to receive a file object from a source; select a second computer to receive the file object from the source; send a first command via the network interface connector to the first computer to download part of the file object from the source, to download part of the file object from the second computer, and to combine the part of the file object from the source with the part of the file object from the second computer to create an instance of the file object on the first computer; send a second command via the network interface connector to the second computer to download part of the file object from the source, to download part of the file object from the first computer, and to combine the part of the file object from the source with the part of the file object from the first computer to create an instance of the file object on the second computer; select a third computer to receive a file object from the first computer; select a fourth computer to receive the file object from the first computer; send a third command via the network interface connector to the third computer to download part of the file object from the first computer, to download part of the file object from the fourth computer, and to combine the part of the file object from the first computer with the part of the file object from the fourth computer to create an instance of the file object on the third computer; and send a fourth command via the network interface connector to the fourth computer to download part of the file object from the first computer, to download part of the file object from the third computer, and to combine the part of the file object from the first computer with the part of the file object from the second computer to create an instance of the file object on the fourth computer.

In one example in accordance with the present disclosure, a method is provided. The method comprises determining a set of computers to receive a file object from a source; grouping the computers in the set of computers into a first tier group of computers and a second tier group of computers; sending a first command via a network interface connector to the first tier group of computers to perform a peer-to-peer download of the file object from the source; and sending a second command via the network interface connector to the second tier group of computers to perform a peer-to-peer download of the file object from a computer in the first tier group of computers.

Figure 1:
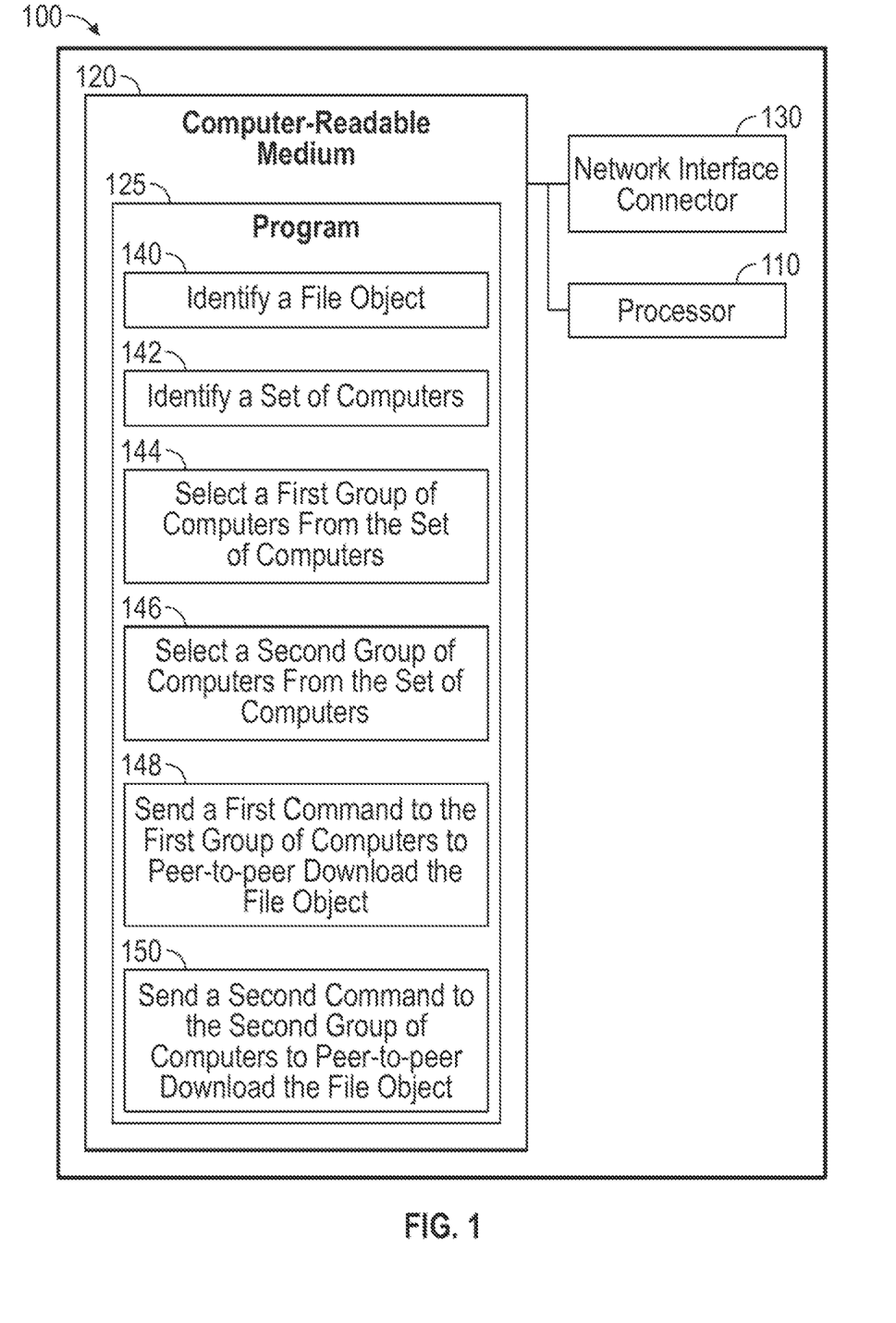
FIG. 1 shows a computer system in accordance with various examples.
Figure 2:
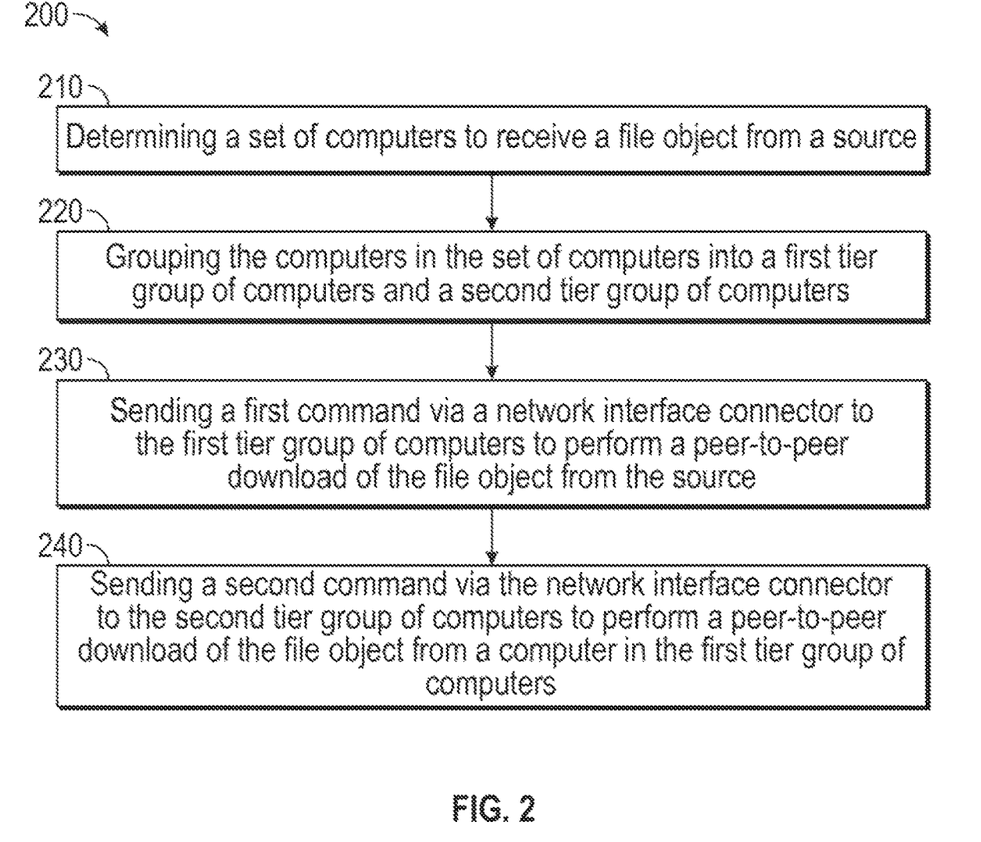
FIG. 2 shows a flow diagram of a method in accordance with various examples.

FIG. 1 shows a computer system 100 in accordance with various examples. Computer system 100 includes a processor 110, a computer-readable medium 120, and a network interface connector 130. The processor 110, computer-readable medium 120, and network interface connector 130 are in communication with each other, such as via a bus. The computer-readable medium 120 may include a program 125, which may be executed by the processor 110. The network interface connector 130 may connect the computer system 100 to an Ethernet network or wireless network. The Ethernet network or wireless network may provide a connection to the Internet. Use of other networks is also contemplated. The computer system 100 may, for example, be a server, a desktop computer, a laptop computer, a mobile phone, a tablet, or an Internet of Things (IoT) device. The computer system 100 may, for example, be a virtual machine that shares the processor 110, computer-readable medium 120, and network interface connector 130 with other virtual machines. Other devices and types of computers are also contemplated. The program 125 may encode computer-readable code, that when executed by the processor 110 may cause the processor 110 to identify a file object 140 available for download from a source, identify a set of computers 142 to receive the file object, select a first group of computers from the set of computers 144, select a second group of computers from the set of computers 146, send a first command to the first group of computers to peer-to-peer download the file object 148, and send a second command to the second group of computers to peer-to-peer download the file object 150. The first and second commands may be sent via the network interface connector 130. The file object may be available from a source, such as a server or a network drive. The first command may comprise information to download the file object from the source and information to exchange file object data amongst the first group of computers. The second command may comprise information to download the file object from a computer in the first group of computers and information to exchange file object data amongst the second group of computers FIG. 2 shows a flow diagram of a method 200 in accordance with various examples. Method 200 includes determining a set of computers to receive a file object from a source (numeral 210). Method 200 includes grouping the computers in the set of computers into a first tier group of computers and a second tier group of computers (numeral 220). Method 200 includes sending a first command via a network interface connector to the first tier group of computers to perform a peer-to-peer download of the file object from the source (numeral 230). Method 200 includes sending a second command via the network interface connector to the second tier group of computers to perform a peer-to-peer download of the file object from a computer in the first tier group of computers (numeral 240). The program 125 may encode computer-readable code, that when executed by the processor 110 causes the processor 110 to perform the method 200.

Figure 3:
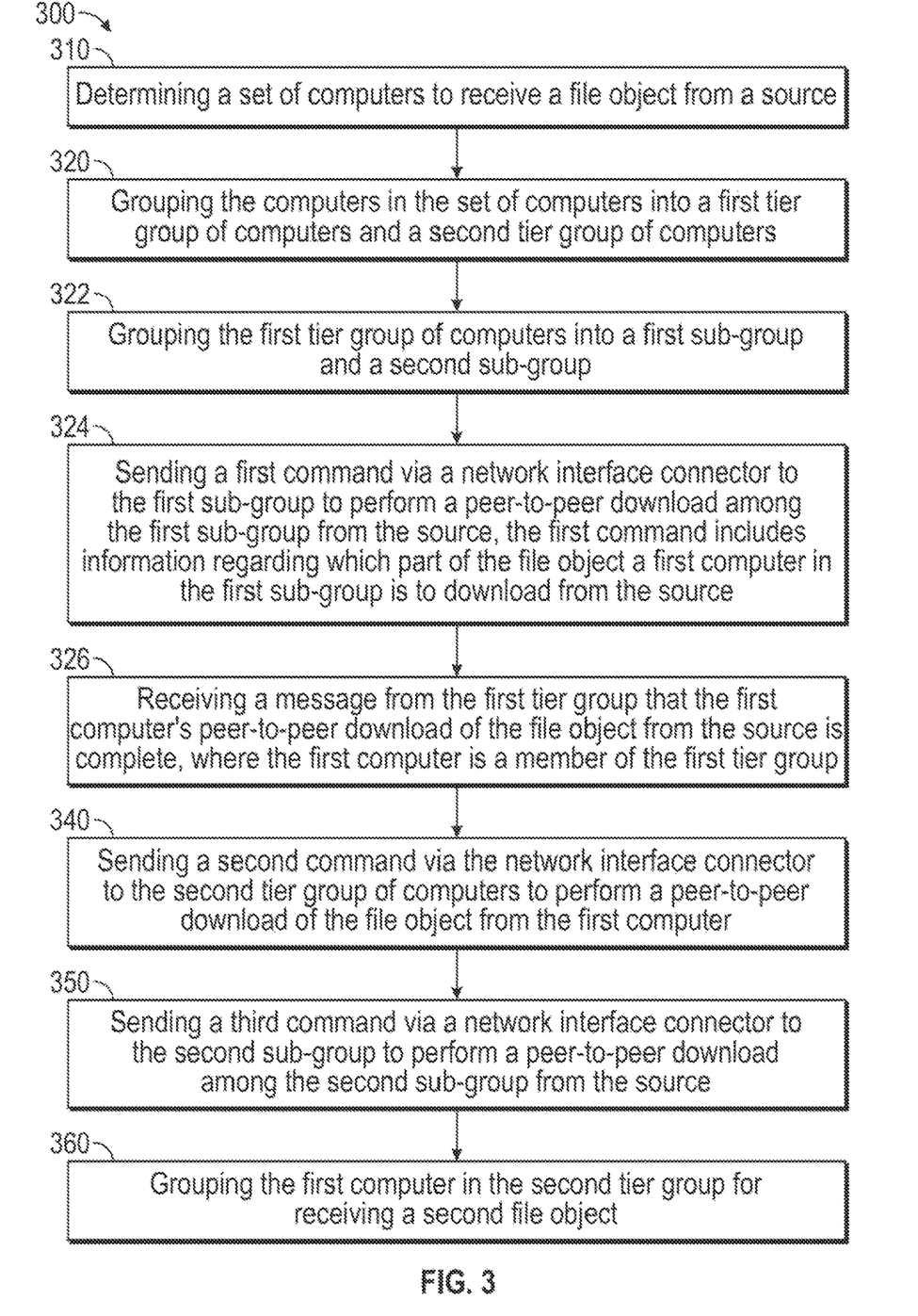
FIG. 3 shows a flow diagram of a method in accordance with various examples.

FIG. 3 shows a flow diagram of a method 300 in accordance with various examples. Method 300 includes determining a set of computers to receive a file object from a source (numeral 310). Method 300 includes grouping the computers in the set of computers into a first tier group of computers and a second tier group of computers (numeral 320). Method 300 includes grouping the first tier group of computers into a first sub-group and a second sub-group (numeral 322). Method 300 includes sending a first command via a network interface connector to the first sub-group to perform a peer-to-peer download among the first sub-group from the source, the first command includes information regarding which part of the file object a first computer in the first sub-group is to download from the source (numeral 324). Method 300 includes receiving a message from the first tier group that the first computer's peer-to-peer download of the file object from the source is complete, where the first computer is a member of the first tier group (numeral 326). Method 300 includes sending a second command via the network interface connector to the second tier group of computers to perform a peer-to-peer download of the file object from the first computer (numeral 340). Method 300 includes sending a third command via a network interface connector to the second sub-group to perform a peer-to-peer download among the second sub-group from the source (numeral 350). Method 300 includes grouping the first computer in the second tier group for receiving a second file object (numeral 360). The first, second, and third commands may occur in different orders. For example, the third command may be sent before the first and second commands are sent, or the third command may be sent after the first and second commands are sent. The program 125 may encode computer-readable code, that when executed by the processor 110 causes the processor 110 to perform the method 300.

Figure 4:
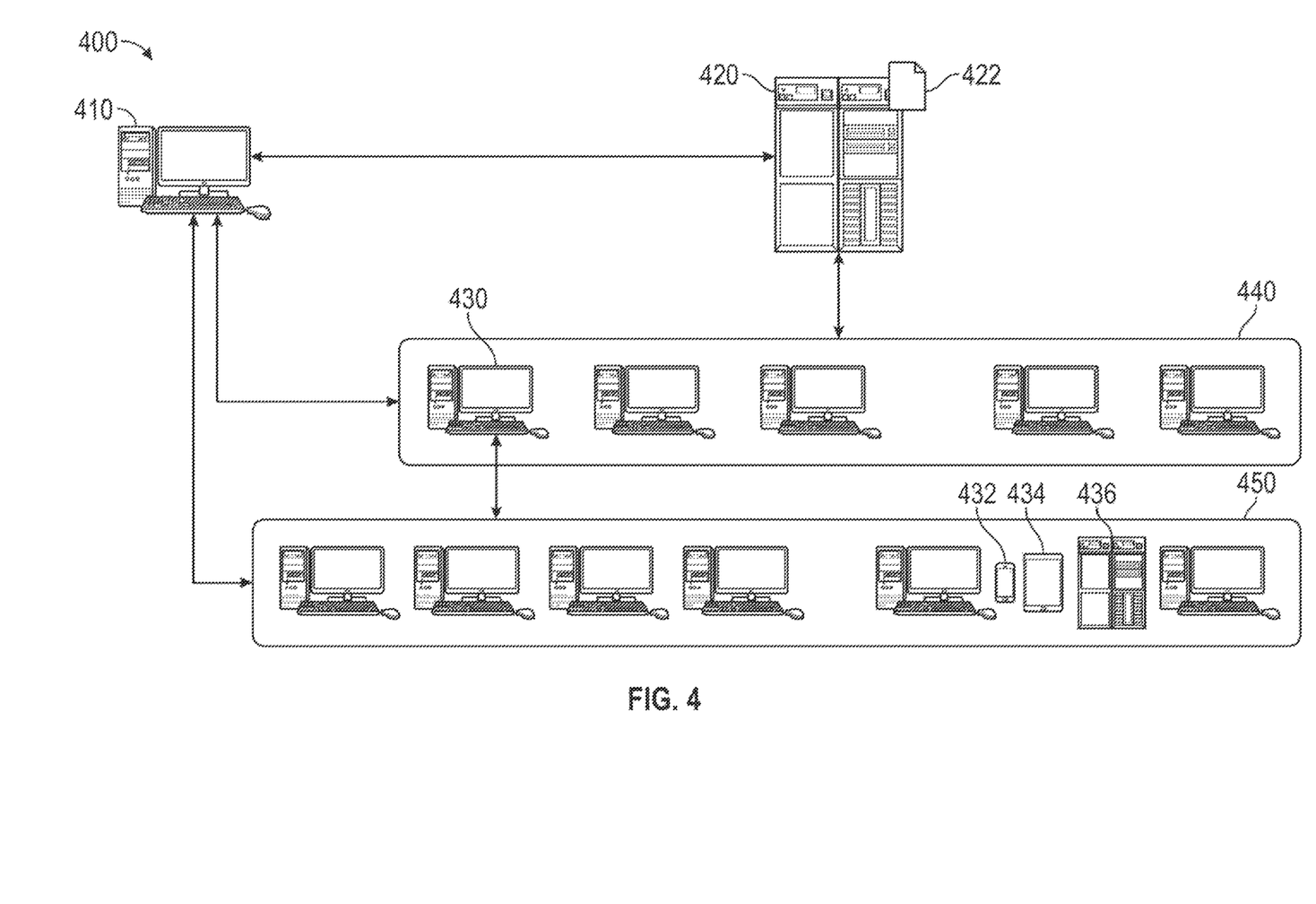
FIG. 4 shows a network of computers in accordance with various examples.

FIG. 4 shows a network of computers 400 in accordance with various examples. The network 400 may include an administration computer 410. The administration computer 410 may be a desktop computer, laptop computer, server, or other appropriate device. The network 400 may include a host 420, that includes a file object 422. The host 420 may be a server, storage device, computer, or other appropriate device. The network 400 may include computers such as desktop computers 430, servers 436, cell phones 432, and tablets 434. The network 400 may include other types of computers, such as laptop computers, virtual machines, and IoT devices. The network 400 may include a first tier group of computers 440 and a second tier group of computers 450, which will be discussed in more detail later herein. The network may include additional computers not included in the first tier group of computers 440 and second tier group of computers 450. FIG. 4 does not depict the actual network connections between the various computers. The double-ended arrows generally indicate communications between various computers or groups of computers across the network 400. The computers may connect to different sub-networks that are interconnected. For example, administration computer 410 and computer 420 may be connected to a local area network via an Ethernet connection, computer 430 may be connected to a different local area network via a wireless connection, and computer 432 may be connected to a mobile phone provider data network, where the individual networks are connected to each other through the Internet. Computers on the network 400 may use a virtual private network (VPN) to communicate with each other. The network 400 may be a corporation's network of computers, which may be located at the corporation's offices, homes of its employees, or other locations. The computers on the network 400 may run an application or agent to receive and act on commands from the administration computer 410.

The file object 422 may need to be distributed to various computers in the network 400. The network 400 may include additional computers to which the file object 422 does not need to be distributed. The administration computer 410, for example, may or may not need the file object 422 distributed to it. The administration computer 410 may, for example, be used by a systems administrator or a server tasked with performing administration functions on the network 400. The administration computer 410 may be multiple computers working together to perform administration functions. One administration function performed by the administration computer 410 may be the distribution of file objects to computers on the network 400, such as file object 422. The file object 422 may be, for example, an application, a patch, or a directory. The file object 422 may be a file, a directory, a compressed or aggregated file, and may include multiple files and directories within the compressed or aggregated file.

According to various examples, the administration computer 410 may determine a set of computers to which to distribute the file object 422. The set of computers to receive the file object 422 may include the computers depicted in the first tier group of computers 440 and the second tier group of computers 450. The administration computer 410 may divide the set of computers to receive the file object into the first tier group of computers 440 and the second tier group of computers 450. E.g., the particular grouping of the computers depicted in FIG. 4 into the depicted first tier group of computers 440 and second tier group of computers 450 may not occur until the administration computer 410 determines the depicted computers are to receive the file object 422, and the administration computer 410 then selects the computers to be considered in the first tier group of computers 440 and the second tier group of computers 450.

The administration computer 410 may communicate with the host 420 to determine that the host 420 includes the file object 422. The administration computer 410 may send a command to the first tier of computers 440 to perform a peer-to-peer download of the file object 422 from the host 420. The command from the administration computer 410 may include an identification of the host 420, the file object 422, and other computers in the first tier group of computers 440. In performing a peer-to-peer download, the file object 422 may be divided into parts. An individual computer in the first tier group of computers 440 may download a part of the file object 422 from the host 420, while other computers in the first tier group of computers 440 download the other parts. The computers in the first tier group of computers 440 may exchange the parts of the file object 422 with each other, so that each computer in the first tier group of computers 440 may assemble the parts into an instance of the file object 422 stored locally on that computer. A computer's peer-to-peer download may be considered complete once it has downloaded the parts to assemble and save an instance of the file object 422, but it may still need to make the parts available for download by other computers in the first tier group of computers 440 that have not yet completed the peer-to-peer download. The first tier group of computers 440 may send a message to the administration computer 410 once the computers have completed the peer-to-peer download. In various examples, each computer in the first tier group of computers 440 may send a message to the administration computer 410 once it completes the peer-to-peer download. In various examples, the first tier group of computers 440 may send a message to the administration computer 410 that all computers in the first tier group of computers 440 have completed the peer-to-peer download.

The administration computer 410 may send a command to the second tier of computers 450 to perform a peer-to-peer download of the file object 422 from a computer in the first tier group of computers 440, such as desktop computer 430. The command from the administration computer 410 may include an identification of the desktop computer 430, which acts as a host for the download by the second tier group of computers 450, the file object 422, and other computers in the second tier group of computers 450. For performing the peer-to-peer download by the second tier group of computers 450, the file object 422 may be divided into the same parts as or different parts than the peer-to-peer download by the first tier group of computers 440. An individual computer in the second tier group of computers 450 may download a part of the file object 422 from the desktop computer 430, while other computers in the second tier group of computers 450 download the other parts. The computers in the second tier group of computers 450 may exchange the parts of the file object 422 with each other, so that each computer in the second tier group of computers 450 may assemble the parts into an instance of the file object 422 stored locally on that computer. The second tier group of computers 450 may send a message to the administration computer 410 once the computers have completed the peer-to-peer download. In various examples, each computer in the second tier group of computers 450 may send a message to the administration computer 410 once it completes the peer-to-peer download. In various examples, the second tier group of computers 450 may send a message to the administration computer 410 that all computers in the second tier group of computers 450 have completed the peer-to-peer download.

Figure 5:
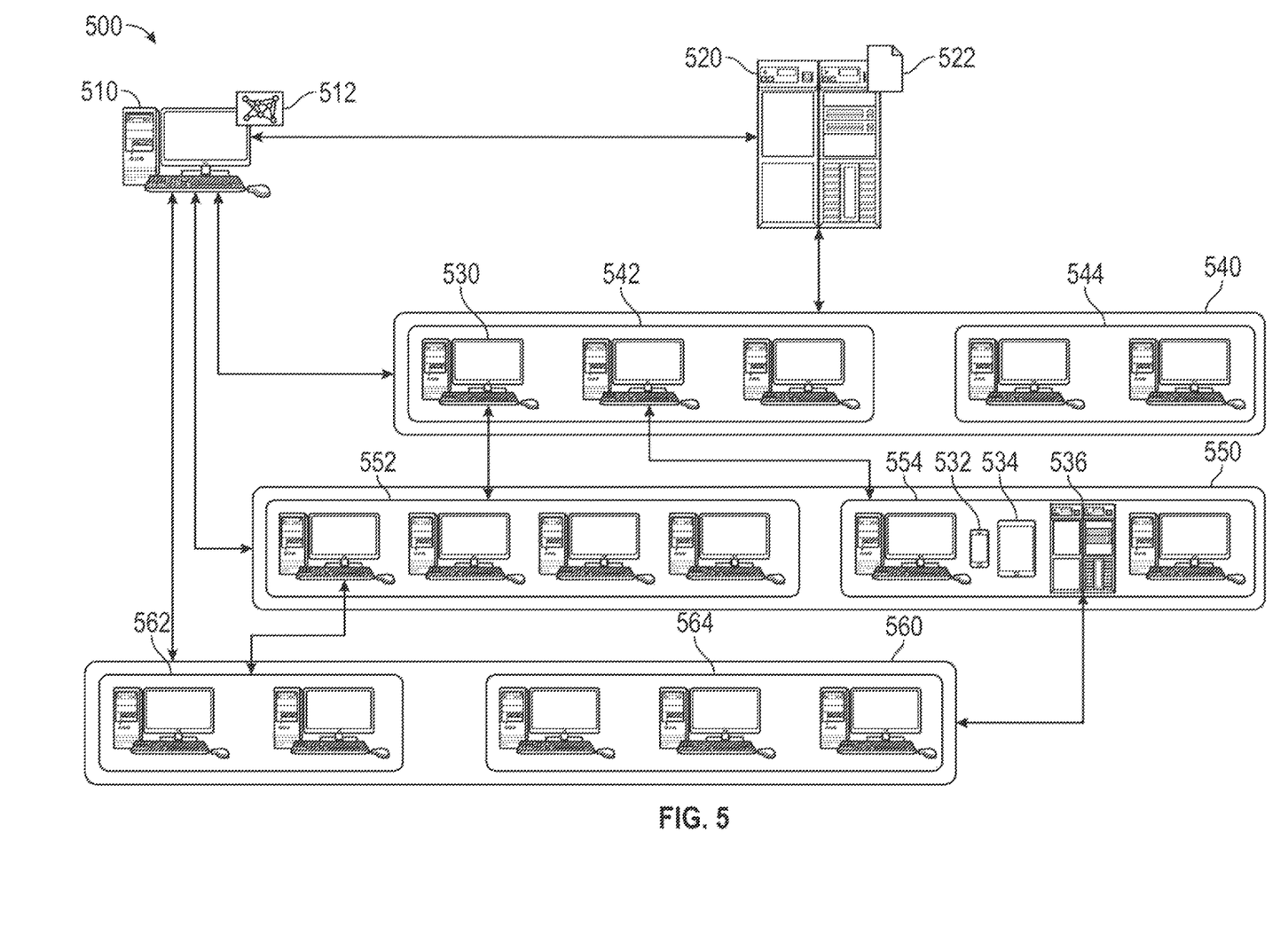
FIG. 5 shows a network of computers in accordance with various examples.

FIG. 5 shows a network of computers 500 in accordance with various examples. The network 500 may include an administration computer 510. The administration computer 510 may include network topography information 512 about the network 500. The network 500 may include a host 520 that includes a file object 522. The network 500 may include a first tier group of computers 540, a second tier group of computers 550, and a third tier group of computers 560. The network may include additional computers not included in the first tier group of computers 540, second tier group of computers 550, or third tier group of computers 560. The first tier group of computers 540 may include sub-groups of computers 542, 544. The second tier group of computers 550 may include sub-groups of computers 552, 554. The third tier group of computers 560 may include sub-groups of computers 562, 564. The network 500 may include computers such as desktop computers 530, servers 536, cell phones 532, and tablets 534. The network 500 may include other types of computers, such as laptop computers, virtual machines, and IoT devices.

According to various examples, the administration computer 510 may determine a set of computers to which to distribute the file object 522. The set of computers to receive the file object 522 may include the computers depicted in the first tier group of computers 540, the second tier group of computers 550, and the third tier group of computers 560. The administration computer 510 may divide the set of computers to receive the file object into the first tier group of computers 540, the second tier group of computers 550, and the third tier group of computers 560. E.g., the particular grouping of the computers depicted in FIG. 5 into the depicted first tier group of computers 540, second tier group of computers 550, and third tier group of computers 560 may not occur until the administration computer 510 determines the depicted computers are to receive the file object 522, and the administration computer 510 then selects the computers to be considered in the first tier group of computers 540, the second tier group of computers 550, and the third tier group of computers 560.

The administration computer 510 may communicate with the host 520 to determine that the host 520 includes the file object 522. The administration computer 510 may send a command to the first tier of computers 540 to perform a peer-to-peer download of the file object 522 from the host 520. The command from the administration computer 510 may include an identification of the host 520, the file object 522, and other computers in the first tier group of computers 540. In performing a peer-to-peer download, the file object 522 may be divided into parts. An individual computer in the first tier group of computers 540 may download a part of the file object 522 from the host 520, while other computers in the first tier group of computers 540 download the other parts. The computers in the first tier group of computers 540 may exchange the parts of the file object 522 with each other, so that each computer in the first tier group of computers 540 may assemble the parts into an instance of the file object 522 stored locally on that computer. A computer's peer-to-peer download may be considered complete once it has downloaded the parts to assemble and save an instance of the file object 522, but it may still need to make the parts available for download by other computers in the first tier group of computers 540 that have not yet completed the peer-to-peer download. The first tier group of computers 540 may send a message to the administration computer 510 once the computers have completed the peer-to-peer download. In various examples, each computer in the first tier group of computers 540 may send a message to the administration computer 510 once it completes the peer-to-peer download. In various examples, the first tier group of computers 540 may send a message to the administration computer 510 that all computers in the first tier group of computers 540 have completed the peer-to-peer download.

The administration computer 510 may send a command to the second tier of computers 550 to perform a peer-to-peer download of the file object 522 from a computer in the first tier group of computers 540, such as desktop computer 530. The command from the administration computer 510 may include an identification of the desktop computer 530, which acts as host for the download by the second tier group of computers 550, the file object 522, and other computers in the second tier group of computers 550. For performing the peer-to-peer download by the second tier group of computers, the file object 522 may be divided into the same parts as or different parts than the download by the first tier group of computers 540. An individual computer in the second tier group of computers 550 may download a part of the file object 522 from the desktop computer 530, while other computers in the second tier group of computers 550 download the other parts. The computers in the second tier group of computers 550 may exchange the parts of the file object 522 with each other, so that each computer in the second tier group of computers 550 may assemble the parts into an instance of the file object 522 stored locally on that computer. The second tier group of computers 550 may send a message to the administration computer 510 once the computers have completed the peer-to-peer download. In various examples, each computer in the second tier group of computers 550 may send a message to the administration computer 510 once it completes the peer-to-peer download. In various examples, the second tier group of computers 550 may send a message to the administration computer 510 that all computers in the second tier group of computers 550 have completed the peer-to-peer download.

Similarly to the second tier group of computers 540, the administration computer 510 may send a command to the third tier group of computers 560 to perform a peer-to-peer download from a computer in the second tier group of computers 550, such as server 536. The third tier group of computers 560 may similarly message the administration computer 510 when the peer-to-peer download is complete. There may be additional computers in the network 500 that are to receive the file object 522. The administration computer 510 may create further tiers of computers and sub-groups of those tiers to perform peer-to-peer downloads from the tiers of computers that have already completed their peer-to-peer download of the file object 522.

According to various examples, the administration computer 510 may divide the first tier group of computers 540 into sub-groups of computers 542, 544. The administration computer 510 may send a command to the sub-groups 542, 544 to perform a peer-to-peer download among the sub-group of computers 542, 544. Computers in sub-group 542 may download the parts of the file object 522 from the host 520 and exchange the parts of the file object 522 with the other computers in sub-group 542 so that the computers in sub-group 542 may assemble the parts into an instance of the file object 522, but not exchange the parts of the file object 522 with sub-group 544. Computers in sub-group 544 may similarly perform a peer-to-peer download from the host 520 through sub-group 544 without exchanging parts of the file object 522 with sub-group 542. The administration computer 510 may similarly divide the second tier group of computers 550 into sub-groups 552, 554 to perform peer-to-peer downloads within the sub-group. The sub-groups 552, 554 may download the file object 522 from different computers in the first tier group of computers 540. For example, sub-group 552 may perform the peer-to-peer download from desktop computer 530, while sub-group 554 performs the peer-to-peer download from a different computer. While FIG. 5 depicts sub-group 552 and sub-group 554 performing the peer-to-peer download from computers in the same sub-group 542 of the first tier group of computers 540, they may perform the peer-to-peer download from computers in different sub-groups 542, 544 of the first tier of computers 540. The administration computer 510 may similarly divide the third tier group of computers into sub-groups 562, 564 to perform the peer-to-peer downloads as sub-groups 562, 564. If more than three tiers of computers are used, the administration computer 510 may similarly divide the additional tiers of computers into sub-groups to perform the peer-to-peer downloads as sub-groups. While FIG. 5 depicts two sub-groups per tier, more sub-groups may be used in each tier. The tiers may have a different number of sub-groups from each other. The tiers may have a different number of sub-groups when distributing a second file object than when distributing a first file object 522.

According to various examples, administration computer 510 may need to receive the file object 522. Administration computer 510 may directly download the file object 522 from the host 520. Administration computer 510 may place itself in one of the tier groups of computers 540, 550, 560 to perform a peer-to-peer download of the file object 522.

According to various examples, more than one file object 522 may be distributed to the same set of computers on the network 500. The multiple file objects may be distributed together as part of the same transaction. The multiple file objects may be distributed separately as part of multiple transactions. If distributed separately, the administration computer 510 may select the same tier groups and sub-groups of computers for distributing the multiple file objects. If distributed separately, the administration computer 510 may select different tier groups or sub-groups of computers for distributing the multiple file objects. A different selection of tier groups or sub-groups of computers may be selected even if the file objects are being distributed at the same time. For example, desktop computer 530 may be in the first tier group of computers 540 for distribution of a first file object but be in the third tier group of computers along with the cell phone 532 for distribution of a second file object.

According to various examples, multiple file objects may be distributed, with each file object being distributed to a different set of computers on the network 500. The administration computer 510 may select the same tier groups and sub-groups of computers for distribution of the multiple file objects. That may result in some computers that do not need one of the file objects to receive the file object anyway as part of a peer-to-peer download. The administration computer 510 may select different tier groups and sub-groups of computers for distribution of the different file objects. The administration computer 510 may only select a computer for one of the tier groups of a file object 522 distribution if the computer is a target computer for the file object 522. For example, desktop computer 530 may be in the first tier group 540 for distribution of a first file object that it needs, but may not be in any tier group for distribution of a second file object, if desktop computer 530 does not need the second file object.

According to various embodiments, some computers in the network 500 may perform a full download of the file object 522 instead of a peer-to-peer download. For example, desktop computer 530 may need the file object 522 and not be selected to be in a tier group of computers or a sub-group of computers to perform a peer-to-peer download. Desktop computer 530 may download the full file object 522 from the host 520 or from server 536 or another computer that has an instance of the file object 522.

According to various embodiments, a sub-group of computers may perform a peer-to-peer download from multiple computers in another tier. For example, sub-group 552 may download part of the file object 522 from desktop computer 530 but download other parts of the file object 522 from another computer in sub-group 542 or from a computer in sub-group 544.

Transferring data across the network 500 may incur various costs. Some computers on the network 500 may be connected to each other through a local area network, while others may only be able to connect to each other through the Internet. It may cost more money to transfer data between two particular computers on the network 500, such as if one of the computers is on a metered connection. The cell phone 532, for example, may need to pay money for each byte downloaded over a cellular connection. Desktop computer 530, for example, may be at a location with a low-speed connection to host 520. Information about the network connections, and costs and limitations associated with them, may be included in the network topographical information 512. The administration computer 510 may consider such factors in selecting the computers for the various tiers and sub-groups of computers.

According to various embodiments, the administration computer 510 may select the computers for the various tiers and sub-groups based on the network topography information 512 and information about the status of the computers in the network 500. The information about the status of the computers in the network 500 may include whether they are connected to the network 500 and powered on, their idle time, their processor usage and processor capability, their network usage and available network bandwidth, their free disk space, and which computers on the network 500 need to use the file object 522. Such information may be kept up-to-date by messaging between the administration computer 510 and other computers in the network 500.

For example, sub-groups of computers 542, 552, 554, 562, 564 may be located at corporate campus location A, while sub-group of computers 544 may be located at corporate campus location B. Corporate campus location A may be in Houston, Tex., while corporate campus location B may be in Austin, Tex. All of the computers at corporate campus location A might be interconnected via a local area network, but need to use the Internet to communicate with computers at corporate campus location B. The corporation may pay more per byte transferred over the Internet than for transfers over the local area network connection at corporate campus location A. The administration computer 510 may obtain such information about bandwidth costs from the network topography information 512. In an effort to minimize bandwidth costs, the administration computer 510 may select the computers at corporate campus location A to be in sub-groups 542, 552, 554, 562, 564 and computers at corporate campus location B to be in sub-group 544. Additional computers at corporate campus location B may be in other sub-groups and tiers not depicted in FIG. 5, but behave similarly to the distribution of the file object 522 at corporate campus location A. Administration computer 510 may use the network topography information 512 to further select the computers at campus location A so that sub-group 552 includes computers that are all on similar sub-sections of the network 500, such as being in the same building H1. Administration computer 510 may select computers to be in sub-group 554, as they are in a different building G4. The sub-groups of other tiers may be similarly selected. For example, the computers in sub-group 562 may include computers that are all on the same floor of building H1. Administration computer 510 may command sub-group 562 to perform the peer-to-peer download from a computer in sub-group 552, because they are all in the same building H1. The computers in sub-group 564 may similarly all be on the same floor of building G4 and instructed to download from server 536 that is in the same building G4. Administration computer 510 may select sub-group 552 to include a computer from each floor of building H1, assign the computers on each floor of building H1 to the same sub-group in the third tier group of computers 560, and assign those sub-groups to download from the computer in sub-group 552 that corresponds to their same floor of building H1. Further tiers of computers might have sub-groups that correspond to sections of a particular floor of building H1 or to sections of a particular floor of building G4. In this way, the first tier group of computers 540 may correspond to corporate campus locations, the second tier group of computers may correspond to buildings, the third tier group of computers may correspond to floors. The actual network topography information 512 may suggest a different grouping of the computers that is more efficient. It is not intended that this disclosure be restricted to grouping by campus locations, buildings, or floors. These have merely been used to describe how a network 500 may be divided into sub-networks according to topographical information, that may correspond to geographical locations.

In various examples, the administration computer 510 may use status information about the computers in grouping the computers into tiers and sub-groups. For example, desktop computer 530 may be selected to be in the first tier group of computers 540 because it has sufficient free disk space to store the file object 522 and because it has a high idle time, which may be because the user assigned to computer 530 is having lunch. Selecting computer 530 to be in the first tier group of computers 540 might allow distribution of the file object to computer 530 with minimal disturbance to its user. After the first tier group of computers 540 have completed their peer-to-peer download, the administration computer 510 may immediately issue a command to the second tier group of computers 550, or sub-groups 552, 554 thereof, to begin their peer-to-peer download. The administration computer 510 may wait before commanding the second tier peer-to-peer downloads. The administration computer 510 may wait to select the computers for the second tier group of computers 550 until the first tier group of computers 540, or a sub-group 542, 544, have completed their peer-to-peer download. As users leave for meetings, have lunch, stay home sick, or perform similar events, the administration computer 510 may detect idle times for groups of computers and command a peer-to-peer download to minimize disruption for the users.

According to various examples, the administration computer 510 may command some computers to download the file object 522 as part of the peer-to-peer download but not to share parts of the file object 522 with other computers in the sub-group. For example, the computer may be a cell phone 532 using a metered or slow connection. By only downloading the file object 522 and not sharing the file object 522, use of the cell phone's 532 network connection may be reduced. Similarly, though cell phone 532 may be in the second tier group of computers 550, it may not be commanded to share the file object 522 for download by the third tier group of computers 560.

According to various examples, the administration computer 510 may command the computers as to which parts of file object 522 they should download from the hosting computer. The administration computer 510 may command the computers as to how much of the file object 522 they are each to download, based on network speed and capacity of the individual computers. The sub-group of computers may coordinate with each other to determine which parts or how much of the file object 522 they will each download from the hosting computer.

According to various embodiments, the administration computer 510 may inform the hosting computer about which computers can download the file object 522 from it. The administration computer 510 may set up a password or other security checks to control which computers can participate in the download. For example, the administration computer 510 may inform server 520 to allow download of the file object 522 by computers in the first tier group of computers 540. The host 520 may reject a download request from a computer in the second tier group of computers. The administration computer 510 may inform desktop computer 530 to make the file object 522 available for download from sub-group 552 in the second tier group of computers 550.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a processor;
a computer-readable medium coupled to the processor;
a network interface connector coupled to the processor and the computer-readable medium; and
a program stored on the computer-readable medium, wherein execution of the program is to cause the processor to:
identify a file object available for download from a source;
identify a set of computers to receive the file object;
select a first group of computers from the set of computers;
select a second group of computers from the set of computers;
send a first command via the network interface connector to the first group of computers, the first command comprising first information to download the file object from the source and the first information to exchange the file object data amongst the first group of computers; and
send a second command via the network interface connector to the second group of computers, the second command comprising second information to download the file object from a computer in the first group of computers and the second information to exchange the file object data amongst the second group of computers.

2. The system of claim 1 further comprising network topography information stored on the computer-readable medium, wherein the network topography information includes information about the set of computers and execution of the program is to further cause the processor to select the first and second group of computers based on the network topography information.

3. The system of claim 2, wherein the second group of computers are topographically closer to each other than the first group of computers.

4. The system of claim 1, wherein execution of the program is to further cause the processor to:
identify a second file object available for download from the source;
identify a second set of computers to receive the second file object;
select a third group of computers from the second set of computers;
select a fourth group of computers from the second set of computers;
send a third command via the network interface connector to the third group of computers, the third command comprising information to download the second file object from the source and information to exchange second file object data amongst the third group of computers; and
send a fourth command via the network interface connector to the fourth group of computers, the fourth command comprising information to download the second file object from a computer in the third group of computers and information to exchange second file object data amongst the fourth group of computers, wherein the first group of computers and third group of computers do not consist of the same computers, and wherein the second group of computers and the fourth group of computers consist of the same computers.

5. The system of claim 1, wherein execution of the program is to further cause the processor to:
receive a message via the network interface connector indicating that a computer in the first group of computers has an instance of the file object; and
send the second command after receiving the message.

6. A system comprising:
a processor;
a computer-readable medium coupled to the processor;
a network interface connector coupled to the processor and the computer-readable medium; and
a program stored on the computer-readable medium, wherein execution of the program is to cause the processor to:
select a first computer to receive a file object from a source;
select a second computer to receive the file object from the source;
send a first command via the network interface connector to the first computer to download part of the file object from the source, to download part of the file object from the second computer, and to combine the part of the file object from the source with the part of the file object from the second computer to create an instance of the file object on the first computer;

send a second command via the network interface connector to the second computer to download the part of the file object from the source, to download part of the file object from the first computer, and to combine the part of the file object from the source with the part of the file object from the first computer to create an instance of the file object on the second computer;

select a third computer to receive the file object from the first computer;

select a fourth computer to receive the file object from the first computer;

send a third command via the network interface connector to the third computer to download the part of the file object from the first computer, to download part of the file object from the fourth computer, and to combine the part of the file object from the first computer with the part of the file object from the fourth computer to create an instance of the file object on the third computer; and send a fourth command via the network interface connector to the fourth computer to download the part of the file object from the first computer, to download part of the file object from the third computer, and to combine the part of the file object from the first computer with the part of the file object from the third computer to create an instance of the file object on the fourth computer.

7. The system of claim 6, wherein execution of the program is to further cause the processor to:

select a fifth computer to receive the file object from the second computer;

select a sixth computer to receive the file object from the second computer;

send a fifth command via the network interface connector to the fifth computer to download the part of the file object from the second computer, to download part of the file object from the sixth computer, and to combine the part of the file object from the second computer with the part of the file object from the sixth computer to create an instance of the file object on the fifth computer; and send a sixth command via the network interface connector to the sixth computer to download the part of the file object from the second computer, to download part of the file object from the fifth computer, and to combine, the part of the file object from the second computer with the part of the file object from the fifth computer to create an instance of the file object on the sixth computer.

8. The system of claim 6, wherein execution of the program is to further cause the processor to:

receive information about the first, second, third, and fourth computers via the network interface connector;

select the first and second computers based on the information.

9. The system of claim 8, wherein the information includes idle time and free disk space.

10. The system of claim 6, wherein the first command comprises an instruction regarding an amount of the file object to download from the source.

11. A method comprising:

determining a set of computers to receive a file object from a source;

grouping the computers in the set of computers into a first tier group of computers and a second tier group of computers;

sending a first command via a network interface connector to the first tier group of computers to perform a peer-to-peer download of the file object from the source, wherein the first command includes information regarding which part of the file object a first computer in the first sub-group is to download from the source; and sending a second command via the network interface connector to the second tier group of computers to perform a peer-to-peer download of the file object from a computer in the first tier group of computers.

12. The method of claim 11, further comprising:

grouping the first tier group of computers into a first sub-group and a second sub-group;

sending the first command via a network interface connector to the first sub-group to perform a peer-to-peer download among the first sub-group from the source; and sending a third command via a network interface connector to the second sub-group to perform a peer-to-peer download among the second sub-group from the source.

13. The method of claim 11, further comprising:

receiving a message from the first tier group that a first computer's peer-to-peer download of the file object from the source is complete; and specifying in the second command that the first computer is the computer in the first tier group of computers from which the second tier group of computers should perform the peer-to-peer download.

14. The method of claim 11, wherein a first computer is a member of the first tier group for the file object and the first computer is a member of the second tier group for a second file object.

* * * * *